United States Patent
Palmer et al.

(10) Patent No.: US 11,732,782 B2
(45) Date of Patent: Aug. 22, 2023

(54) TRANSMISSION SYSTEM

(71) Applicant: NEW MOTION LABS LTD., Exeter (GB)

(72) Inventors: Josh Daniel Palmer, London (GB); Lucas Lobmeyer, Loehnberg (DE); Marcel Fowler, London (GB)

(73) Assignee: NEW MOTION LABS LTD., Exeter (GB)

( * ) Notice: Subject to any disclaimer, the term of this patent is extended or adjusted under 35 U.S.C. 154(b) by 148 days.

(21) Appl. No.: 17/344,388

(22) Filed: Jun. 10, 2021

(65) Prior Publication Data

US 2021/0301906 A1    Sep. 30, 2021

Related U.S. Application Data

(63) Continuation-in-part of application No. 16/629,918, filed as application No. PCT/GB2018/000105 on Jul. 10, 2018.

(30) Foreign Application Priority Data

Jul. 13, 2017 (GB) .................................. 1711342
Sep. 28, 2017 (GB) .................................. 1715782
Oct. 24, 2017 (GB) .................................. 1717436

(51) Int. Cl.
*F16H 7/06* (2006.01)
*F16G 13/06* (2006.01)
*F16H 55/30* (2006.01)

(52) U.S. Cl.
CPC .............. *F16H 7/06* (2013.01); *F16G 13/06* (2013.01); *F16H 55/30* (2013.01)

(58) Field of Classification Search
CPC .............. F16H 7/06; F16H 55/30; F16G 13/06
USPC ........................................................ 474/148
See application file for complete search history.

(56) References Cited

U.S. PATENT DOCUMENTS

| 2,489,039 | A | 11/1949 | Law |
| 4,290,762 | A | 9/1981 | Lapeyre |
| 4,378,719 | A | 4/1983 | Burgess |
| 6,090,003 | A * | 7/2000 | Young ..................... F16H 55/30 |
| | | | 474/160 |
| 6,526,740 | B1 | 3/2003 | Tanemoto et al. |

(Continued)

FOREIGN PATENT DOCUMENTS

| CN | 102537210 | 7/2012 |
| DE | 102014206896 | 10/2014 |

(Continued)

OTHER PUBLICATIONS

Intellecutal Property Office, Search Report, Application No. GB2011083.9, dated Jan. 11, 2021, 1 page.

(Continued)

*Primary Examiner* — Gene O Crawford
*Assistant Examiner* — Emily R Kincaid
(74) *Attorney, Agent, or Firm* — Saliwanchik, Lloyd & Eisenschenk

(57) ABSTRACT

A transmission system can include a drive sprocket and a drive member adapted to mesh with the drive sprocket. The drive sprocket can include a plurality of teeth for meshing with the drive member to transmit rotary motion, and the drive member can include a plurality of engagement pockets adapted to engage the teeth of the drive sprocket.

14 Claims, 10 Drawing Sheets

(56) References Cited

U.S. PATENT DOCUMENTS

| | | | |
|---|---|---|---|
| 2004/0185977 A1 | 9/2004 | Young et al. | |
| 2006/0068959 A1* | 3/2006 | Young | F16G 13/04 |
| | | | 474/212 |
| 2008/0176688 A1 | 7/2008 | Sakura et al. | |
| 2009/0286639 A1* | 11/2009 | Sakura | F16H 55/08 |
| | | | 474/152 |
| 2010/0203992 A1* | 8/2010 | Botez | F16H 7/06 |
| | | | 29/893.3 |
| 2013/0225345 A1 | 8/2013 | Bodensteiner et al. | |
| 2014/0057750 A1 | 2/2014 | Yokoyama | |
| 2014/0141913 A1* | 5/2014 | Yokoyama | F16G 13/18 |
| | | | 474/206 |
| 2016/0348755 A1 | 12/2016 | Ritz et al. | |

FOREIGN PATENT DOCUMENTS

| | | |
|---|---|---|
| EP | 0171561 | 2/1986 |
| EP | 0611000 | 8/1994 |
| EP | 1033509 | 9/2000 |
| EP | 1120586 | 3/2006 |
| GB | 2351543 | 1/2001 |
| JP | 3501493 | 3/2004 |
| WO | 99/49239 | 9/1999 |

OTHER PUBLICATIONS

Intellectual Property Office, Search Report, Application No. GB2018496.6, dated Mar. 30, 2021, 1 page.
Intellectual Property Office, Search Report, Application No. GB2102302.3, dated Jun. 17, 2021, 1 page.
Intellectual Property Office, Search Report, Application No. GB2108320.9, dated Nov. 25, 2021, 1 page.
International Search Report, International Application No. PCT/GB2021/051787, dated Nov. 8, 2021, 3 pages.
Chinese Search Report, Chinese Application No. 201880046123.5.
Intellectual Property Office, Search Report, GB Application No. 1717436.8, dated Jan. 5, 2018.
International Search Report dated Oct. 24, 2018 for PCT/GB2018/000105.

* cited by examiner

TRANSMISSION SYSTEM

CROSS-REFERENCE TO RELATED APPLICATIONS

This application is a continuation-in-part (CIP) application of U.S. patent application Ser. No. 16/629,918, filed Jan. 9, 2020, which is a national stage application of International Patent Application No. PCT/GB2018/000105, filed Jul. 10, 2018, which claims priority to Great Britain Application No. 1711342.4, filed Jul. 13, 2017, Great Britain Application No. 1715782.7, filed Sep. 28, 2017, and Great Britain Application No. 1717436.8, filed Oct. 24, 2017, the disclosures of all of which are incorporated herein by reference in their entirety, including any figures, tables, and drawings.

BACKGROUND TO THE INVENTION

This invention relates to a transmission system, and particularly, but not exclusively to a transmission system comprising a drive sprocket and a drive member, wherein the drive sprocket comprises a plurality of teeth. The invention also relates to a drive sprocket for use in a transmission system.

Drive sprockets, or pulleys, having a plurality of teeth for use with drive members such as power transmission chains or belts are well known, and often take the form of a substantially circular sprocket having a plurality of teeth spaced apart around an outer circumference of the sprocket.

A variety of different drive members may be used with such drive sprockets. A first type of known drive member is a power transmission chain in the form of a roller chain. The roller chain has a plurality of engaging formations for enabling engagement with the drive sprocket. The engaging formations are in the form of receiving formations, for receiving the teeth of the drive sprocket. An example of a use of a roller chain is for a bicycle. The roller chain for a bicycle passes around a front drive sprocket in the form of a chainring, and it also passes around a rear drive sprocket in the form of a gear wheel. The known roller chains are also able to be used in many other different types of apparatus including, for example, tricycles, motorcycles and chain saws.

A second type of known drive member is a power transmission chain comprising a silent chain. The silent chain also has a plurality of engaging formations for enabling engagement with the drive sprocket. The engaging formations are in the form of tooth formations for being received in receiving recesses formed between adjacent teeth on the drive sprocket. The silent chain is used for high torque applications which need high efficiency and the transfer of a lot of power.

Typical of such applications is the use of a silent chain as a timing chain for engines. The silent chain is also often referred to as a HY-VO chain.

A third type of know drive member is a belt which is adapted to engage with the teeth of a pulley.

As is well known, a drive member enables transmission of power between drive sprockets. Known drive sprockets may drive the drive member as in the case of a chainring on a bicycle, or the drive sprockets may be driven by the drive member as in the case of rear cogs on a bicycle.

It is known that power transmission chains are formed by chain links which are pivotally contacted together by pivots which extend transversely completely across the chain link.

The known drive members and known drive sprockets do not transmit power as efficiently as would be desired. More specifically, the known drive members invariably make contact with the drive sprockets under significant loads, and in such situations, the drive members frequently tend to move relative to the teeth of the sprocket whilst maintaining contact under this high loading. The result is that the known power transmission chains do not work efficiently on the drive sprockets.

In addition, when the chain links of known drive members articulate at connecting pivots, friction leads to energy losses and component wear. This results in further efficiency losses and decreased drive lifetime.

SUMMARY OF THE INVENTION

According to a first aspect of the present invention there is provided a transmission system comprising a drive sprocket and a drive member adapted to mesh with the drive sprocket, the drive sprocket comprising a plurality of teeth for meshing with the drive member to transmit rotary motion and the drive member comprising a plurality of engagement pockets adapted to engage the teeth of the drive sprocket, wherein each tooth of the drive sprocket has a tooth profile defined by a first side comprising a first engagement surface and an opposite second side comprising a second engagement surface, which engagement surfaces are configured such that when driven, a tooth meshes to an engagement pocket at a first contact location on the first engagement surface and also at a second contact location on the second engagement surface, the first contact location being radially offset from the second contact location, wherein the drive member comprises a roller chain comprising a plurality of spaced apart rollers, each roller being spaced apart from adjacent rollers by a predetermined distance, and connected to an adjacent roller by a rigid connecting member extending between two adjacent rollers whereby the engagement pockets are defined between adjacent rollers, wherein, a first engagement pocket is formed by first and second rollers which are adjacent to one another, a second engagement pocket is formed by the first roller and a third roller, and a third engagement pocket is formed by the second roller and a fourth roller, the third roller being adjacent to the first roller, and the fourth roller being adjacent to the second roller, and wherein an angle formed between a connecting member connecting the first and second rollers, and a connecting member connecting the first and third rollers, comprises a first articulation angle, and an angle formed between the connecting member connecting the first and second rollers, and a connecting member connecting the second and fourth rollers comprises a second articulation angle, wherein, the magnitude of the first articulation angle formed when the first second and third rollers are all in contact with a tooth is different to the magnitude of the second articulation angle formed when the first second and fourth rollers are all in contact with a tooth.

By means of the present invention therefore, a transmission system is provided in which the articulation angle at a first roller that is in contact with a first tooth at a first contact point is different to the articulation angle at a second roller which is in contact with the same tooth on an opposite side of the tooth at a second contact point when a third roller is in contact with a second tooth adjacent to the first tooth on the first side of the first tooth, and a fourth roller is in contact with a third tooth adjacent to the first tooth on the second side the first tooth.

The drive member may be regarded as comprising a plurality of articulation points, and the articulation angles are defined at the articulation points.

In embodiments of the invention, the connecting members comprise links. In such embodiments of the invention, the links articulate about the articulation points, and the articulation angles define the degree of articulation between a first link and a second link.

In embodiments of the invention, a roller is situated on each articulation point such that each tooth is engaged by two rollers where:

the two roller contact points are on opposite sides of the tooth;

the contact points are radially offset from one another; and the distance between two adjacent roller centres is always the same.

By having the magnitude of the first articulation angle not equal to the magnitude of the second articulation angle, the efficiency of the sprocket is improved. This is because in a conventional roller chain, alternate links articulate via two different types of articulation, known as bush articulations and pin articulations. During pin articulations, the pin of the articulating link rotates within the bush of the adjacent link which remains stationary relative to the sprocket. In bush articulations, the bush of the articulating link rotates within the roller and around the pin of the adjacent link which remains stationary relative to the sprocket. Bush articulations thus cause sliding at two surfaces during articulation, whilst pin articulations cause sliding at only one. This means that more energy is lost during a bush articulation than during a pin articulation. On a conventional roller chain, the articulation type alternates each articulation. By means of the present invention, the net energy losses of the drivetrain can be reduced by reducing the size of the articulation angle associated with the less efficient bush articulation and increasing the size of the articulation angle associated with the more efficient pin articulation.

The difference in articulation angle can also be employed to reduce the wear at the pin-bush interface that leads to chain elongation, known as chain stretch. The load at the pin-bush interface during bush articulations is less than that during pin articulations. This means that bush articulations lead to more wear than pin articulations. By means of the present invention, the net pin-bush wear in the drive member can be reduced by reducing the size of the articulation angle associated with the higher wearing pin articulation and increasing the size of the articulation angle associated with the lower wearing bush articulation.

In embodiments of the invention, the first roller is a load bearing roller, and the second roller is a supporting roller.

In embodiments of the invention, the magnitude of the first articulation angle is greater than the magnitude of the second articulation angle.

In embodiments of the invention, the magnitude of every other articulation angle is the same. In such embodiments, the articulation angle will therefore alternate between two values.

In embodiments of the invention, where the first roller is a load bearing roller and the second roller is a support roller the first articulation angle at each load bearing roller will be the same, and the second articulation angle at each support roller will the same.

In other embodiments of the invention, there may be a different variation between the articulation angles at articulation points around the sprocket. The magnitude of the articulation angles may be chosen to suit the prevailing conditions.

In embodiments of the invention, the shape of each tooth face is symmetrical about a radial axis of the tooth.

In embodiments of the invention, the first side of each face is defined at least partially by a first face arc, and the second side of each face is defined at least partially by a second face arc.

In some embodiments of the invention the first face arc forms a base portion of the first side of each tooth, and the second face arc forms a base portion of the second side of each tooth, wherein the first and second face arcs each comprise a roller seating curve.

In such embodiments of the invention, the roller seating curve is adapted to receive a roller or other engaging part of the drive member which is adapted to mesh with the sprocket.

In some embodiments of the invention each first and second side comprises a second portion comprising a convex arc extending from a respective roller seating curve towards the tip portion of a respective tooth.

In such embodiments of the invention the second portion comprising a convex arc may comprise a working curve. The convex arc shape of the working curve allows the drive member to articulate during engagement and disengagement without making contact with a tooth of the sprocket.

The drive sprocket may further comprise a supporting curve extending from the roller seating curve of a first tooth towards a roller seating curve of an adjacent tooth.

In such embodiments of the invention, the supporting curve is adapted to receive a roller to support the roller.

In embodiments of the invention the roller chain comprises a plurality of inner links, each of which serves to connect two rollers to form a roller pair, and a plurality of outer links, each of which serves to connect roller pairs to one another to form the roller chain, such that a space is defined between inner surfaces of facing inner links, and also between inner surfaces of facing outer links wherein each tooth has a width which is the same as, or slightly less than the distance between inner surfaces of facing outer links, and greater than the distance between inner surfaces of facing inner links.

In such embodiments of the invention, because each tooth of the sprocket has a width which is the same as, or slightly less than the distance between inner surfaces of facing outer links, the tooth will fit between facing outer links with very little clearance between outside surfaces of the tooth and the inside surfaces of the facing outer links. The width of the tooth will also prevent the teeth from engaging between facing inner links, so the sprocket will be able to engage with the teeth between outer links only, and not between inner links. This helps to maintain the alignment of the roller chain during use.

This is in sharp contrast to the situation in known transmission systems, where, because the width of each tooth is less than the distance between inner surfaces of facing inner links, it is possible for the teeth of a known sprocket to engage with either the inner links or the outer links of the chain. This means that when the teeth of a known sprocket engage with the outer links, there will be significant clearance between the outside surfaces of the tooth and the inside surfaces of facing outer links.

In embodiments of the invention, each tooth of the sprocket comprises a first width which is the same as or slightly less than the distance between inner surfaces of facing inner links, and a second width that is the same as or slightly less than the distance between the inner surfaces of facing outer links.

In such embodiments, the portion of each tooth that has the first width prevents the inner links from interfering with the tooth when the tooth is engaged between facing outer links.

According to a second aspect of the invention there is provided a sprocket forming part of a transmission system according to embodiments of the first aspect of the invention, and further comprising a drive member comprising a plurality of spaced apart rollers.

BRIEF DESCRIPTION OF THE DRAWINGS

The invention will now be further described by way of example only with reference to the accompanying drawings in which.

DETAILED DESCRIPTION

Figure 1:
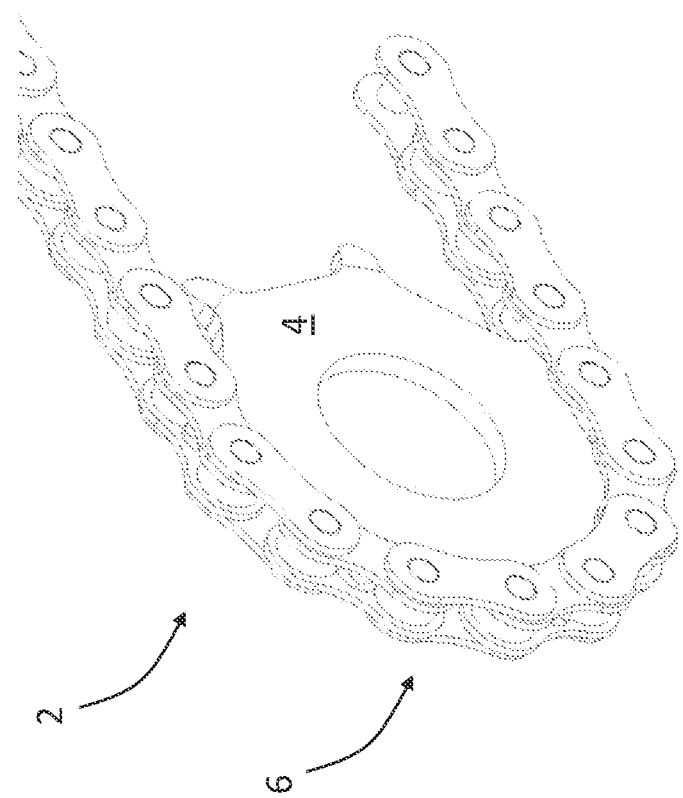
FIG. 1 is a schematic representation of a transmission system according to an embodiment of the first aspect of the invention comprising a roller chain engaged with a sprocket according to an embodiment of the second aspect of the invention.
Figure 2:
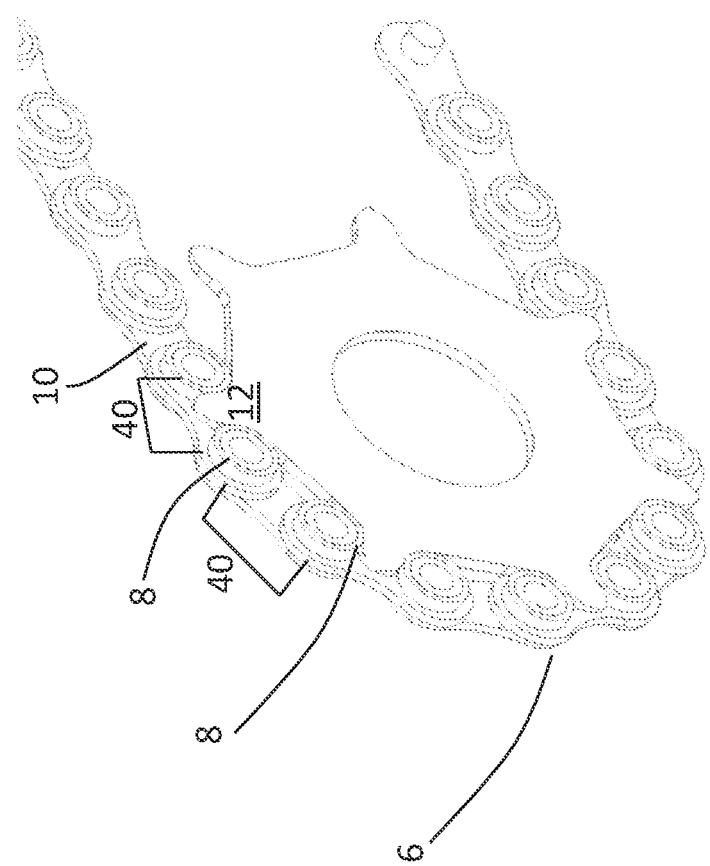
FIG. 2 is a schematic representation of the transmission system of FIG. 1 with some links removed to show more clearly how the rollers of the chain engage with the sprocket.

Referring initially to FIGS. 1 and 2 a transmission system according to an embodiment of the invention is designated generally by the reference numeral 2. The transmission system comprises a sprocket 4 and a drive member comprising a roller chain 6.

In this embodiment of the invention the roller chain 6 is a standard roller chain comprising a plurality of rollers 8 which extend transversely across the transmission member and are spaced apart along the length of the drive member to form the chain. The rollers are connected to one another by links 10 in a known manner. The roller chain 6 is able to articulate between adjacent rollers 8. An engagement pocket 40 is defined between adjacent rollers 8. Each engagement pocket 40 is adapted to engage with a tooth 12 as will be described in more detail below.

By means of the present invention, however, only every other engagement pocket 40 will engage with a tooth during use of the transmission system 2. The remaining every other engagement pockets 40 will effectively engage with the space between adjacent teeth 12.

Figure 3:
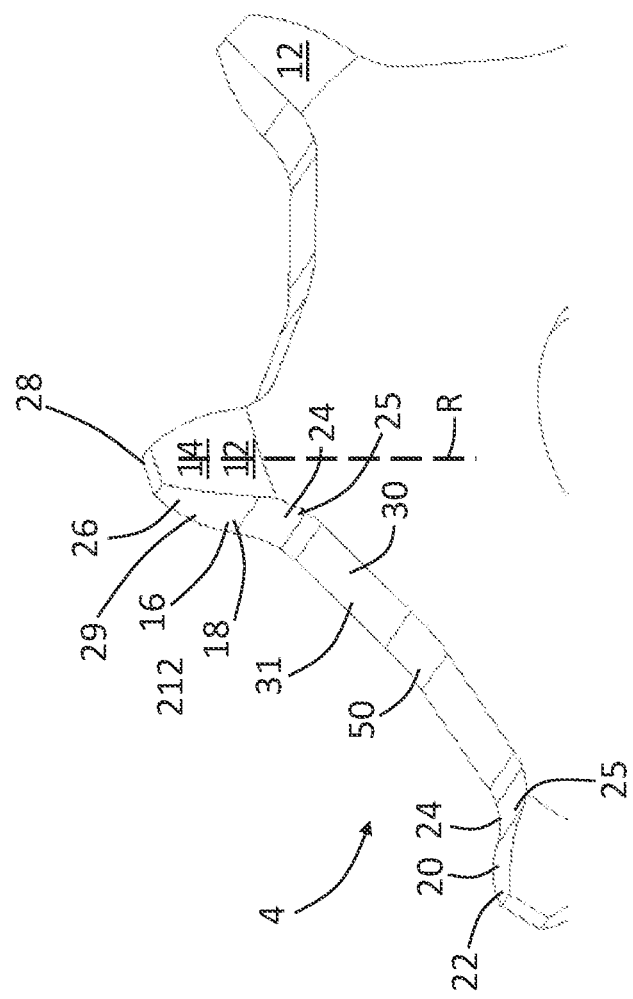
FIG. 3 is a perspective view of part of the sprocket of FIG. 1 showing the tooth profile of the teeth of the sprocket.

Turning now to FIG. 3, the sprocket 4 is shown in more detail.

The sprocket 4 comprises a plurality of teeth 12 which are all shaped substantially identically to one another. Each tooth has a tooth face or profile 14 which is symmetrical about a radial axis R of the sprocket 4.

The tooth profile 14 is defined by a first side 16 comprising a first engagement surface 18, and a second side 20 defining a second engagement surface 22. Each of the first and second sides 16,20 comprises a base portion 24 which forms a roller seating curve 25. Each side further comprises a portion 26 extending from the roller seating curve towards a tip 28 of the tooth. The portion 26 is convex and defines a working curve 29.

The sprocket 4 comprises a further curve 30 forming a supporting curve 31 which extends between adjacent teeth.

Figure 4:
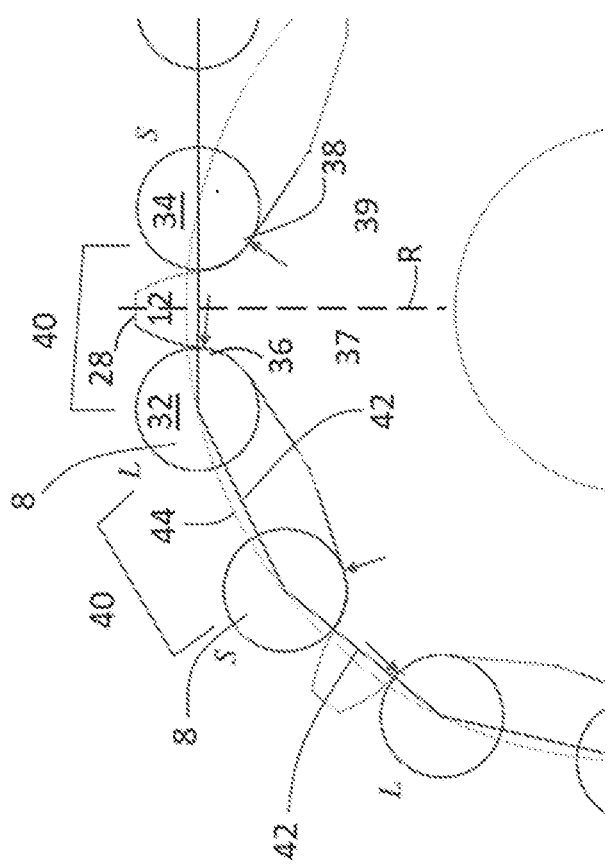
FIG. 4 is a schematic representation showing how the rollers of the roller chain engage with the teeth of the sprocket.

As shown in FIG. 4 particularly, in use of the transmission system 2, every other engagement pocket 40 will engage with a respective tooth 12 whilst the remaining every other engagement pocket 40 will not engage a tooth. This is because, due to the dimensions of the sprocket, and particularly the profile of the tooth, relative to the dimensions of the rollers 8, when the roller chain 6 is engaged with the sprocket 4 there will be two rollers 8 positioned between adjacent teeth. This in turn means that every other engagement pocket 40 will engage with a tooth 12, with every other engagement pocket effectively engaging with spaces between adjacent teeth 12 of the sprocket.

Referring to FIG. 4 the manner in which the rollers 8 engage with the sprocket 4 during use of the transmission system 2 is shown schematically.

When considering a pair of rollers 8 positioned on either side of a tooth 12, one roller 32 will be a load bearing roller, and the second roller 8 will be a supporting roller 34.

The roller seating curve 25 provides an initial seating position for the engaged rollers 8 of the roller chain 6. For both load bearing and supporting rollers, this curve helps to distribute the contact load over a larger area reducing material stresses, at least initially when the chain wear is low. The roller seating curve 25 enables rollers to easily transition between supporting and load bearing positions if the drive direction is ever reversed.

The load bearing roller 32 will engage with the tooth 12 on a first engagement surface 36, and the support roller 34 will engage with the tooth at a second engagement surface 38.

The first and second engagement surfaces 36,38 are radially offset from one another. This enables the pair of rollers 8 engaging the tooth 12 to engage with dual engagement, since the roller chain makes contact with the sprocket teeth 12 at two contact points 37, 39 on engagement surfaces 36, 38 in each tooth of the sprocket.

The two contact points 37, 39 are thus on opposing sides of the tooth relative to its radial centreline R, and are radially offset from one another and therefore not symmetric relative to the radial centreline R.

The combination of these features leads to a secure engagement of the drive sprocket tooth by the roller chain 6 and ensures that the rollers 8 do not become wedged on the tooth. In addition, there is little to no relative movement between the tooth and the rollers 8 whilst in contact.

The first contact point 37 is load bearing and transfers the load between the roller chain 6 and the tooth 12. The second contact point 39 is supporting and thus stabilises the roller chain 6 on the sprocket 4 and increases the load distribution over the sprocket teeth 12.

As shown in FIG. 4, each tooth 12 further comprises a working curve 26 that extends from the roller seating curve towards the tip 28 of the tooth.

The working curve 26 is convex, and the convex arc forming the working curve 26 curves towards the tooth centreline R. The surface of working curve 26 makes contact with the load bearing roller 32, enabling torque transfer between the roller chain 6 and the sprocket 4. As the chain pitch elongates due to internal wear, this surface also accommodates the climbing of the load-bearing roller.

Turning again to FIG. 3, the sprocket further comprises a supporting curve 50 which extends between the roller seating curves of adjacent teeth.

As mentioned above, the rollers 8 of the roller chain 6 are able to articulate relative to one another via the links connecting adjacent rollers to one another.

Figure 6:
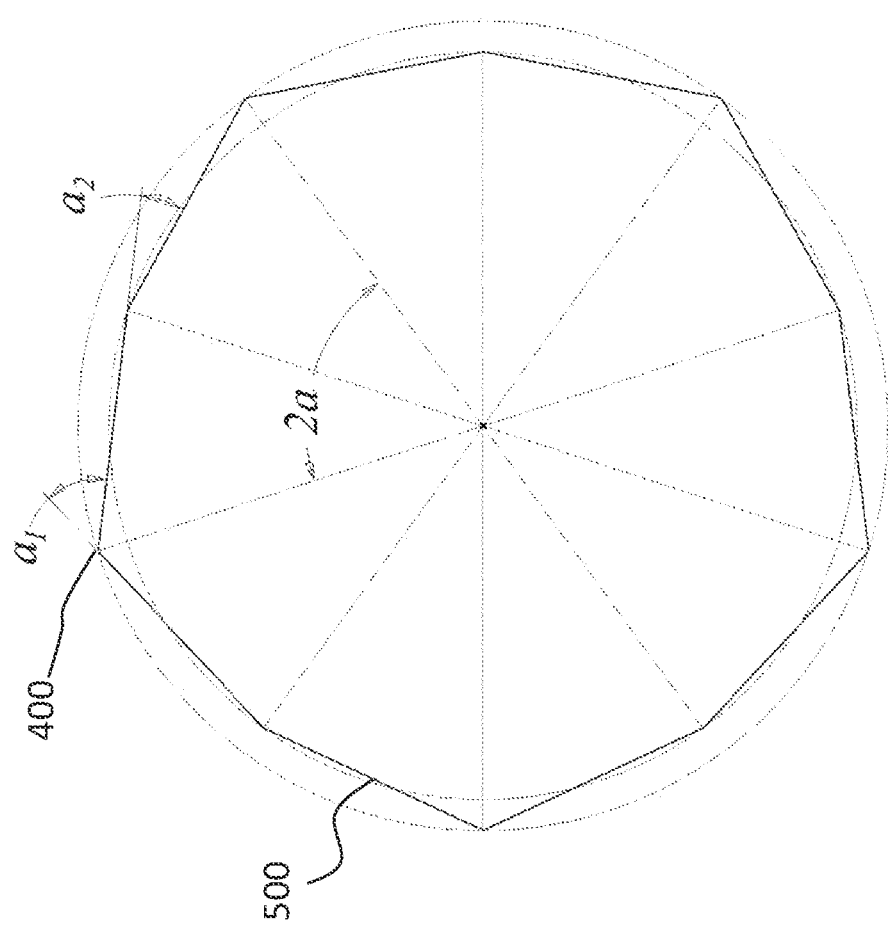
FIG. 6 is a schematic representation of a polygon formed by the articulation points of a sprocket forming part of a transmission system according to a second embodiment of the invention.

In FIG. 6 two articulations angles are shown, $a_1$ and $a_2$ and these will now be explained further.

First roller 32 and second roller 34 are shown forming a first engagement pocket 401 which meshes with a first tooth 112. A third roller 322 is in contact with a second tooth 212 and is positioned to one side of the first roller 32. The third roller 322 and the first roller 32 together form a second engagement pocket 402.

A fourth roller 422 is positioned adjacent to second roller 34 and is in contact with a third tooth 312. The second and fourth rollers 34, 422 together form a third engagement pocket 403.

Figure 5:
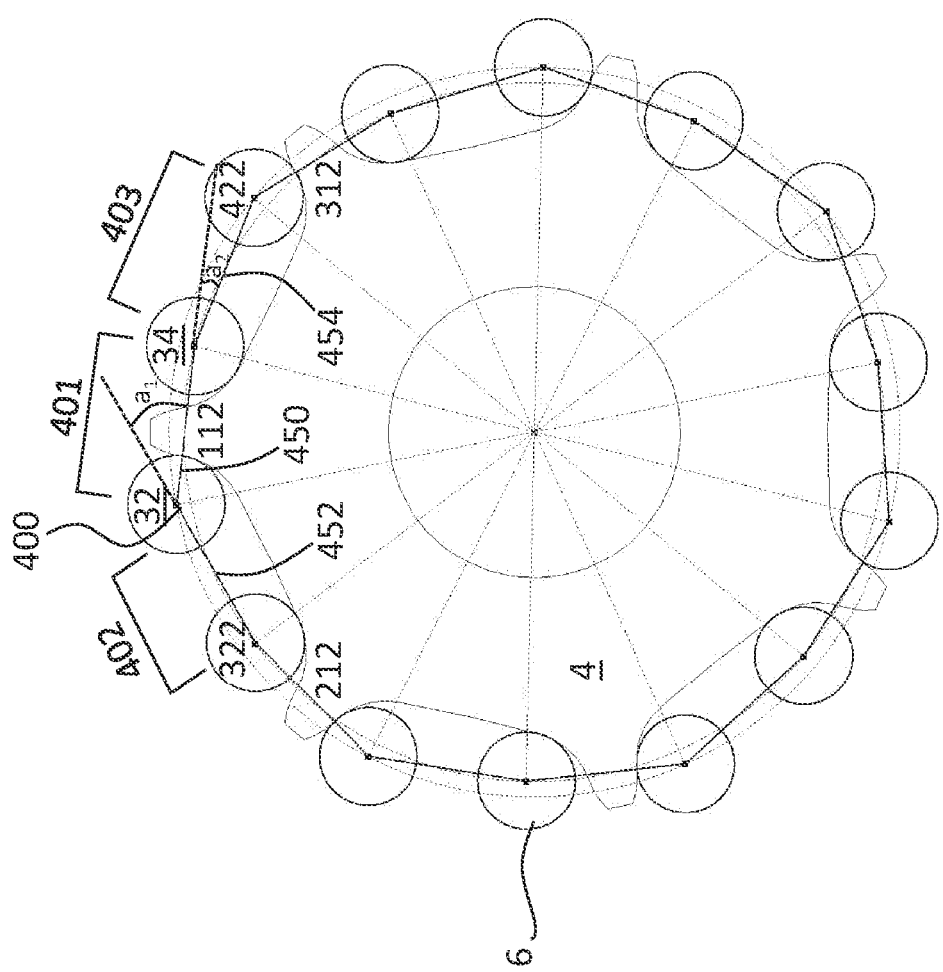
FIG. 5 is a schematic representation of the transmission system of FIG. 1 showing how the rollers of the roller chain engage with the teeth of the sprocket and showing the articulation angles.

In this embodiment of the invention, the first roller 32 is a load bearing roller, and the second roller 34 is a support roller. Every other roller starting with the load bearing roller 32 will also be a load bearing roller. With reference to FIG. 5 therefore, the fourth roller 422 is also a load bearing roller. This pattern will repeat itself around the sprocket 4.

At the point that first roller 32 makes contact with first tooth 112, and third roller 322 is also in contact with a second tooth 212, first roller 32 and third roller 322 are positioned on their respective engagement surfaces, and the second roller 34 is in position, a first articulation angle $a_1$ is formed at an articulation point 400, which in this embodiment coincides with the axis of the first roller 32.

Considering now the second roller 34 and fourth roller 422, the second articulation angle $a_z$ is formed at the second roller 34 when the second roller 34 and the fourth roller 422 are in contact with a respective tooth 12, and the first roller 322 is in contact with tooth 112.

The magnitude of the first articulation angle $a_1$ at the point defined above, is in this example greater than the second articulation angle $a_z$ at the point defined above.

Similarly, every other roller starting with the second roller 34 is a support roller. In this embodiment therefore the third roller 322 is also a support roller and this pattern will repeat itself around the sprocket 4.

In this embodiment, every other articulation angle will be the same. This means that the articulation angle $a_1$ will be at every load bearing roller, and the articulation angle $a_z$ will be at every support roller.

Adjacent rollers are connected to one another by a link which provides a rigid connection between adjacent rollers.

In this embodiment, first roller 32 is connected to second roller 34 by link 450. Third roller 322 is connected to first roller 32 by link 452, and second roller 34 is connected to fourth roller 422 by link 454.

It is the links 450, 452, 454 which articulate relative to one another as shown by the articulation angles.

Because the articulation angle at each load bearing roller 32, 422 is larger in this embodiment that the articulation angle $a_z$ at every support roller 34, 322, each load bearing roller 332 will articulate for a longer duration than is the case with each support roller 34. This can improve the efficiency of the transmission system.

By means of the present invention therefore it is possible to achieve selective articulation by setting the articulation angle at each tooth to be different, or to follow a regular pattern as is the case in this embodiment.

This is desirable from the perspective of both power transmission efficiency and chain wear. Articulation under load causes inevitable friction between adjacent chain links. This leads to both energy loss and component wear. The size of these losses is roughly proportional to the size of the articulation angle.

The losses associated with each articulation alternates with the alternating inner and outer chain links of a standard power transmission roller chain. The articulation of the outer link is more efficient than the inner, while the articulation of the inner link leads to less chain elongation than the outer. By using selective articulation, the magnitude of the beneficial or deleterious effects of a given articulation can be manipulated to improve the drive trains overall performance.

Figure 7:
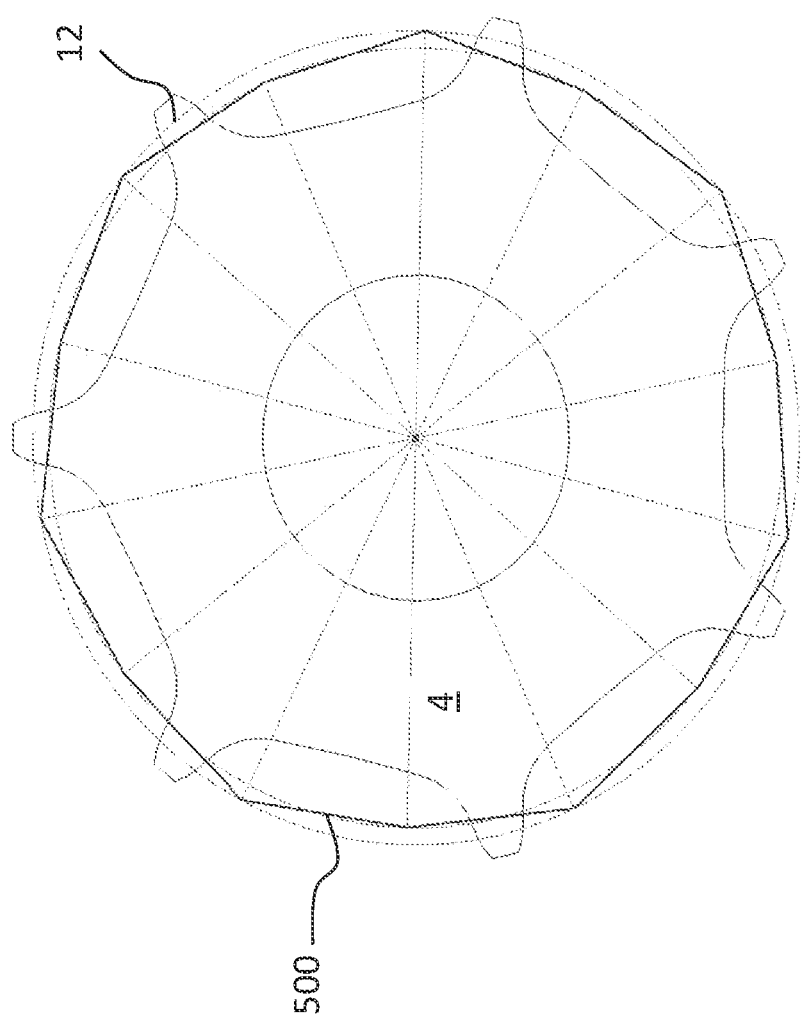
FIG. 7 is a schematic representation of the polygon of FIG. 6 superimposed on the sprocket of FIG. 6 showing the rollers arranged around the sprocket.

As shown particularly in FIGS. 6 and 7, the articulation points 400 in a transmission system according to embodiments of the invention define a n sided irregular polygon 500.

In embodiments of the invention where the first articulation angle is $a_1$ and the second is $a_2$, the pattern is repeated for every pair of links around the sprocket circumference.

Thus, the relationship between these new articulation angles and the original exterior angle of a polygon of n sides, a is, $a_1 + a_2 = 2a$ as shown in FIG. 6.

To achieve this n sided irregular polygon, a sprocket of n/2 teeth is used, where a tooth sits between the vertices of every other side of the polygon. This is shown more clearly in FIG. 7.

Figure 8:
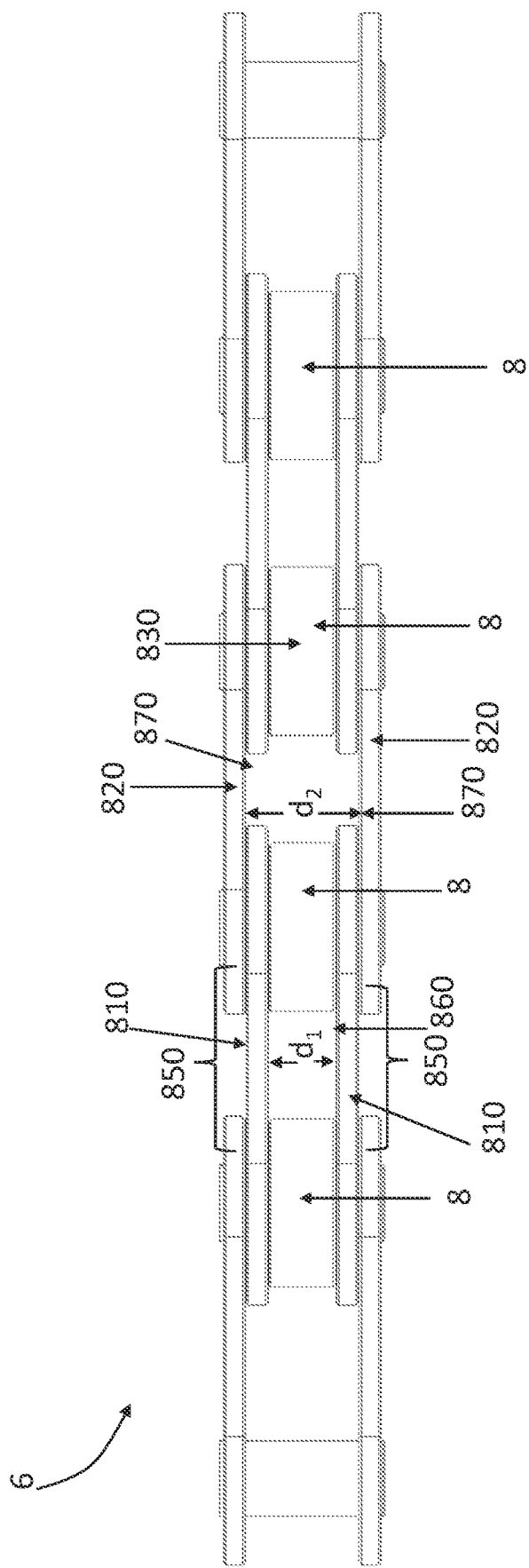
FIG. 8 is a schematic representation of a portion of the roller chain of FIG. 1 showing inner links and outer links.
Figure 9:
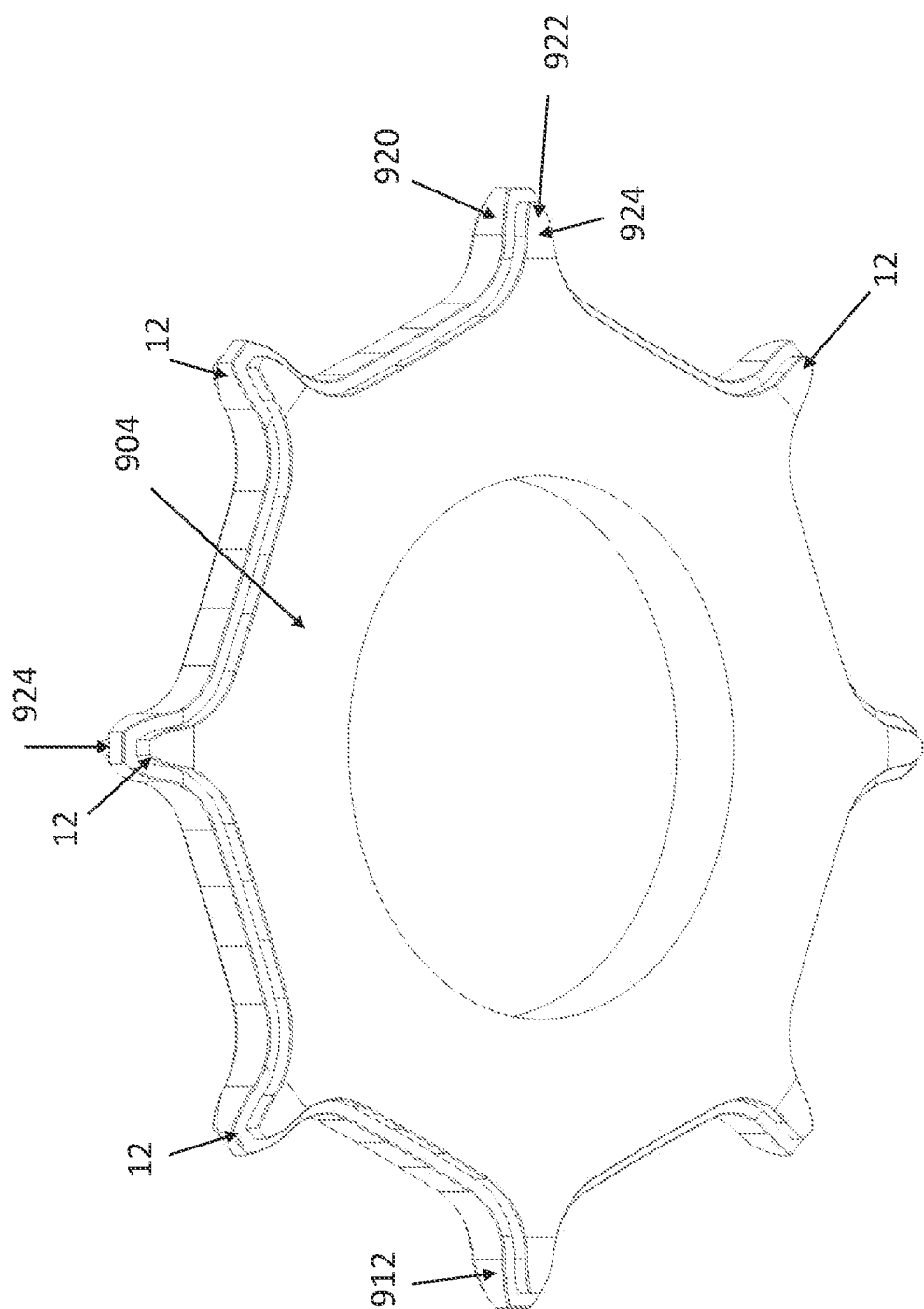
FIG. 9 is a schematic representation of a sprocket according to another embodiment of the invention wherein each tooth has a first width and a second width, the second width being greater than the first width.
Figure 10:
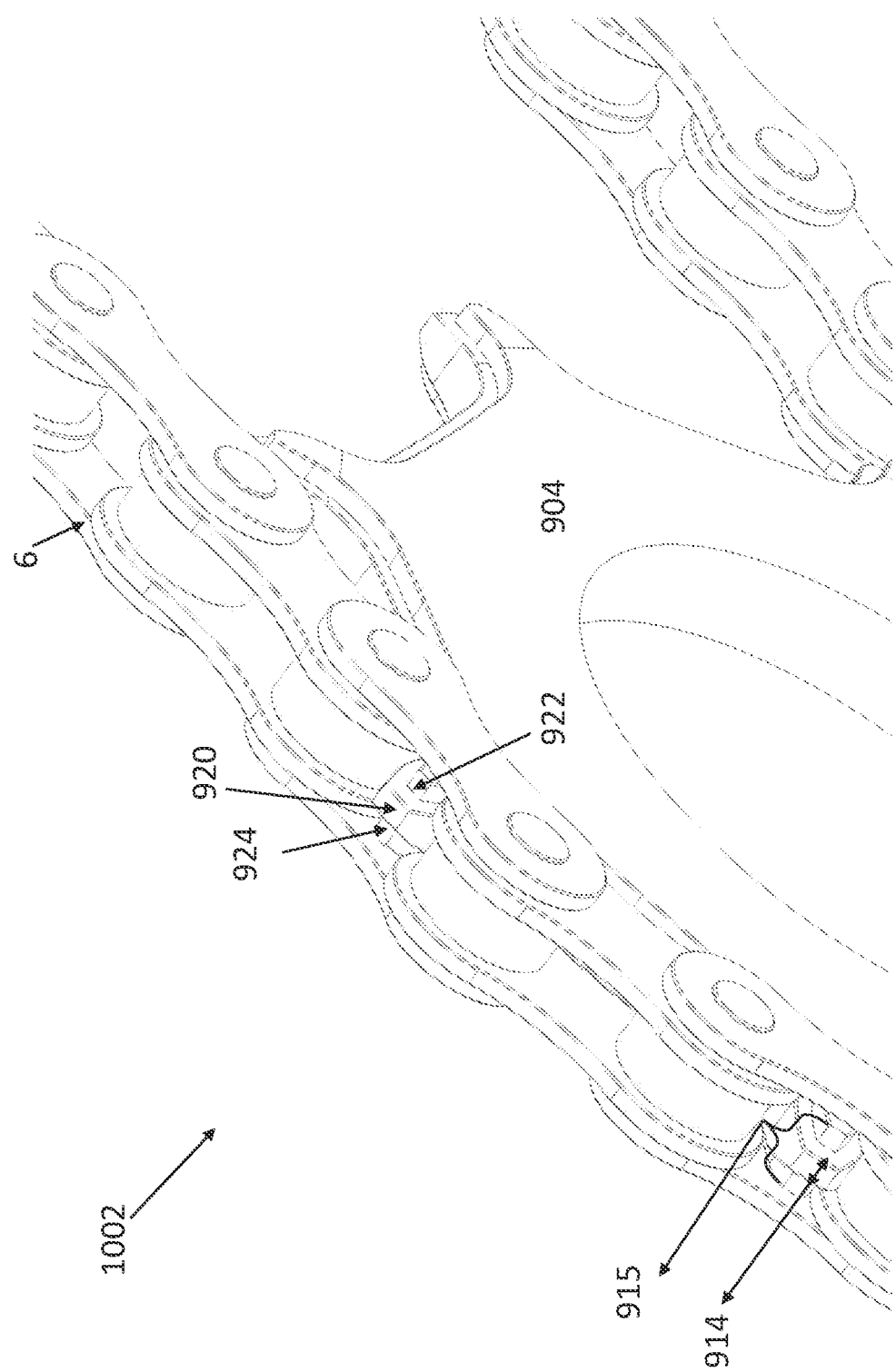
FIG. 10 is a schematic representation showing the sprocket of FIG. 9 engaged with a standard roller chain of the type shown in FIG. 8.

Turning now to FIGS. 8 to 10, a sprocket 904 according to another embodiment of the invention is illustrated schematically. The sprocket 904 forms part of a transmission system 1002 comprising the sprocket 904 and a roller chain 6.

Parts of the transmission system 1002 that are equivalent to the transmission system 2 described above will be given corresponding reference numerals for ease of reference.

As shown particularly in FIG. 8, the roller chain 6 comprises a plurality of rollers 8. The rollers 8 are connected to adjacent rollers by means of inner links 810 and outer links 820.

The inner links 810 serve to connect two rollers 8 together to form a roller pair 850. The outer links serve to connect roller pairs 850 together to form the roller chain 6. The distance between inner surfaces 860 of inner links 810 is indicated by the reference numeral $d_1$ in FIG. 8. The distance between inner surfaces 870 of facing outer links 820 is indicated by the reference numeral $d_2$. As shown in FIG. 8, $d_2$ is greater than $d_1$.

Turning now to FIGS. 9 and 10, the sprocket 904 is described in more detail.

The sprocket comprises a plurality of teeth 12 spaced apart around the sprocket. Each tooth has a first width 914 that is equal to or slightly less than the distance between inner surfaces of facing inner links 800 ($d_1$).

Each tooth 12 also has a second width 915 which is equal to or slightly less than the distance between the inner surfaces 870 of outer links 820 ($d_2$).

In this embodiment of the invention each tooth comprises a middle tooth portion 920 and outer tooth portions 922, 924 which together define the second width.

When the sprocket 904 engages with the roller chain 6, the teeth will be positioned between two outer links as shown in FIG. 10. The width of the outer tooth portions 922, 924 together with the width of the middle portion 920 results in an overall tooth width that is the same as or slightly less than the distance ($d_2$) between inner surfaces of facing outer links, and greater than the distance ($d_1$) between the inner surfaces of facing inner links. This means that the fit between the tooth 12 and the chain 6 is such that there is little clearance between the tooth and the chain. Furthermore, the presence of the outer tooth portions 922, 924 prevents the teeth from engaging between inner links, and thus the alignment of the chain is substantially maintained during use of the drive transmission system.

In addition, the presence of the middle portion 920 prevents the inner links from interfering with the tooth during use.

What is claimed is:

1. A transmission system comprising a drive sprocket and a drive member adapted to mesh with the drive sprocket, the drive sprocket comprising a plurality of teeth for meshing with the drive member to transmit rotary motion and the drive member comprising a plurality of engagement pockets adapted to engage the teeth of the drive sprocket, wherein each tooth of the drive sprocket has a tooth profile defined by a first side comprising a first engagement surface and an opposite second side comprising a second engagement surface, which engagement surfaces are configured such that when driven, a tooth meshes to an engagement pocket at a first contact location on the first engagement surface and also at a second contact location on the second engagement surface, the first contact location being radially offset from the second contact location, wherein the drive member comprises a roller chain comprising a plurality of spaced apart rollers, each roller being spaced apart from adjacent rollers by a predetermined distance, and connected to an adjacent roller by a rigid connecting member extending between two adjacent rollers whereby the engagement pockets are defined between adjacent rollers, wherein, a first engagement pocket is formed by first and second rollers which are adjacent to one another, a second engagement pocket is formed by the first roller and a third roller, and a third engagement pocket is formed by the second roller and a fourth roller, the third roller being adjacent to the first roller, and the fourth roller being adjacent to the second roller, and wherein an angle formed between a connecting member connecting the first and second rollers, and a connecting member connecting the first and third rollers, comprises a first articulation angle, and an angle formed between the connecting member connecting the first and second rollers, and a connecting member connecting the second and fourth rollers comprises a second articulation angle, wherein, the magnitude of the first articulation angle formed when the first second and third rollers are all in contact with a tooth is different to the magnitude of the second articulation angle formed when the first second and fourth rollers are all in contact with a tooth.

2. A transmission system according to claim 1, wherein the drive member comprises a plurality of articulation points, and the articulation angles are defined at articulation points.

3. A transmission system according to claim 1, wherein the first roller comprises a load bearing roller and the second roller comprises a supporting roller.

4. A transmission system according to claim 1, wherein the magnitude of the first articulation angle is greater than the magnitude of the second articulation angle.

5. A transmission system according to claim 1, wherein the magnitude of every other articulation angle is substantially the same.

6. A transmission system according to claim 1, wherein the shape of each tooth face is symmetrical about a radial axis of the tooth.

7. A transmission system according to claim 1, wherein the first side of each face is defined at least partially by a first face arc, and the second side of each face is defined at least partially by a second face arc.

8. A transmission system according to claim 7, wherein the first face arc forms a base portion of the first side of each tooth, and the second face arc forms a base portion of the second side of each tooth, wherein the first and second face arcs each comprise a roller seating curve.

9. A transmission system according to claim 8, wherein the roller seating curve is adapted to receive a roller which is adapted to mesh with the drive sprocket.

10. A transmission system according to claim 8, wherein each first and second side comprises a second portion comprising a convex arc extending from a respective roller seating curve towards a tip portion of a respective tooth.

11. A transmission system according to claim 8, comprising a supporting curve extending from the roller seating curve of a first tooth towards a roller seating curve of an adjacent tooth.

12. A transmission system according to claim 1, wherein the roller chain comprises a plurality of inner links, each of which serves to connect two rollers to form a roller pair, and a plurality of outer links, each of which serves to connect roller pairs to one another to form the roller chain, such that a space is defined between inner surfaces of facing inner links, and also between inner surfaces of facing outer links wherein each tooth of the drive sprocket has a first width which is the same as, or slightly less than the distance between inner surfaces of facing outer links, and greater than the distance between inner surfaces of facing inner links.

13. A transmission system according to claim 12, wherein each tooth of the drive sprocket comprises a second width which is the same as or slightly less than the distance between inner surfaces of facing inner links.

14. A drive sprocket forming part of a transmission system according to claim 1.

* * * * *